US012570125B2

(12) United States Patent
Ragazzi et al.

(10) Patent No.: US 12,570,125 B2
(45) Date of Patent: Mar. 10, 2026

(54) TRIP INFORMATION CONTROL SCHEME

(71) Applicant: Ford Global Technologies, LLC, Dearborn, MI (US)

(72) Inventors: Franco Ragazzi, Ann Arbor, MI (US); Donald Peter Schneider, Commerce Township, MI (US); John Craig Elson, Bloomfield Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1696 days.

(21) Appl. No.: 16/763,116

(22) PCT Filed: Nov. 17, 2017

(86) PCT No.: PCT/US2017/062381
§ 371 (c)(1),
(2) Date: May 11, 2020

(87) PCT Pub. No.: WO2019/099033
PCT Pub. Date: May 23, 2019

(65) Prior Publication Data
US 2020/0361284 A1 Nov. 19, 2020

(51) Int. Cl.
*B60H 1/00* (2006.01)

(52) U.S. Cl.
CPC ..... *B60H 1/00778* (2013.01); *B60H 1/00385* (2013.01)

(58) Field of Classification Search
CPC ........... B60H 1/00778; B60H 1/00385; B60W 10/06; B60W 10/08
See application file for complete search history.

(56) References Cited

U.S. PATENT DOCUMENTS

| | | | |
|---|---|---|---|
| 8,249,749 B2 | 8/2012 | Dage et al. |
| 8,615,355 B2 | 12/2013 | Inbarajan et al. |
| 9,114,794 B2 | 8/2015 | King et al. |
| 9,121,710 B2 | 9/2015 | Gusikhin et al. |
| 9,579,949 B2 | 2/2017 | Patel |
| 9,682,609 B1 | 6/2017 | Dudar |
| 2001/0010261 A1 | 8/2001 | Oomura et al. |
| 2007/0262855 A1 | 11/2007 | Zuta et al. |

(Continued)

OTHER PUBLICATIONS

International Search Report of the International Searching Authority for PCT/US2017/062381 with mailing date of Feb. 1, 2018.

*Primary Examiner* — Aniss Chad
*Assistant Examiner* — Chase L Cooley
(74) *Attorney, Agent, or Firm* — Emily Drake; Brooks Kushman P.C.

(57) ABSTRACT

A climate control system for a vehicle includes a thermal management system and a controller configured to activate the thermal management system. The controller activates the thermal management system to satisfy a remote precondition request for a cabin of the vehicle, responsive to receiving the remote precondition request, data indicating the vehicle is in a ventilated area, and an estimated precondition time being less than a threshold precondition time. Each of the estimated precondition and threshold precondition times are derived from the remote precondition request and data.

20 Claims, 4 Drawing Sheets

(56) References Cited

U.S. PATENT DOCUMENTS

| | | | | |
|---|---|---|---|---|
| 2008/0117079 A1* | 5/2008 | Hassan | ................ | F02N 11/101 340/901 |
| 2013/0079978 A1 | 3/2013 | Uyeki | | |
| 2014/0081481 A1 | 3/2014 | Nishida et al. | | |
| 2014/0330453 A1 | 11/2014 | Nakagawa | | |
| 2015/0129192 A1 | 5/2015 | Boss et al. | | |
| 2016/0047348 A1* | 2/2016 | Bauerle | .............. | F02N 11/0807 290/38 C |
| 2016/0368345 A1 | 12/2016 | Farooq et al. | | |
| 2017/0274730 A1* | 9/2017 | Boss | ................ | B60H 1/00771 |

* cited by examiner

TRIP INFORMATION CONTROL SCHEME

CROSS-REFERENCE TO RELATED APPLICATIONS

This application is the U.S. national phase of PCT/US2017/062381 filed Nov. 17, 2017, the disclosure of which is hereby incorporated in its entirety by reference herein.

TECHNICAL FIELD

The present disclosure relates to a trip information control scheme for improving fuel economy and range, as well as cabin thermal comfort.

BACKGROUND

Conventional vehicles typically burn excess fuel and/or diminish range in order to heat and/or cool the cabin for occupant thermal comfort without knowing expected trip information or preferences prior to departure. The excess burn and diminished range also typically occur when it is not necessary to meet certain cabin thermal comfort targets.

For example, an electrified vehicle (EV) may be heated and cooled from the battery, and the battery temperature may be affected by the surrounding temperature and load. In such events, the cabin is conditioned from the battery cutting into driving range targets. As such, the trip may be too short, where the vehicle will not reach occupant thermal comfort targets even with extra fuel burn in heating mode for combustion engines, or the trip may be too short such that the trip may not reach occupant thermal comfort targets through excess battery draw. In other situations, the trip may involve fast acceleration (e.g., highway driving), and thus not need the extra fuel burn for IC heating, not need excess battery draw initially, or the battery may heat up quickly affecting power/range.

In certain instances, the occupant may want to remote start their vehicle in some markets to precondition the vehicle to a certain temperature. The occupant may not be able to see the fuel economy cost of remote starting the vehicle, and cannot time the preconditioning of the vehicle for optimal comfort or fuel economy. Similarly, the occupant may not be able to specify a preference on a scale between fuel economy and comfort. Thus, the vehicle is unable to optimize fuel economy and driving range targets with occupant comfort requests.

SUMMARY

According to an embodiment, a climate control system for a vehicle is disclosed. The climate control system includes a thermal management system and a controller configured to activate the thermal management system. The controller activates the thermal management system to satisfy a remote precondition request for a cabin of the vehicle, responsive to receiving the remote precondition request, data indicating the vehicle is in a ventilated area, and an estimated precondition time being less than a threshold precondition time. Each of the estimated precondition and threshold precondition times are derived from the remote precondition request and data.

According to one or more embodiments, the controller may be configured to receive input indicative of an occupant preference for fuel economy over comfort. In some embodiments, the controller may be further configured to, responsive to the input, activate the thermal management system and inform an occupant of the estimated precondition time. In other embodiments, the controller may be further configured to, responsive to the input and an accelerated precondition time derived from the data, activate the thermal management system to satisfy the precondition request based on the accelerated precondition time. In one or more embodiments, the controller may be further configured to, responsive to the estimated precondition time being greater than a departure time derived from the data, prompting a user to provide confirmation of a delayed departure or an accelerated precondition via a connected device, and activating the thermal management system to satisfy the precondition request based on the confirmation. The data may be received from external connected devices, GPS, thermal sensors, occupant preferences, or a weather service. The data may be indicative of trip data, weather, route data, calendar events, departure data, number of occupants, location of occupants, remote start restrictions, or smart building data. According to some embodiments, the controller may be further configured to, responsive to data indicating a remote start restriction, send a confirmation request to a connected device or connected smart building. Further, the controller may be configured to, responsive to receiving confirmation, activate the thermal management system to satisfy the precondition request and communicate with the connected smart building. In some embodiments, the controller may be further configured to, responsive to the estimated precondition time being greater than the threshold precondition time, determine a modified precondition and activate the thermal management system to satisfy the modified precondition. In one or more embodiments, the controller may be configured to, responsive to a cabin heat request, a coolant temperature, a time to threshold coolant temperature derived from the data being greater than a cabin heat time, and a total travel time being greater than the time to threshold temperature, activate the thermal management system to satisfy the cabin heat request. The thermal management system may be configured to, responsive to the total travel time being less than the time to threshold coolant temperature, activate a predefined powertrain strategy.

According to an embodiment, a method of preconditioning a vehicle is disclosed. The method includes, by a controller, receiving a remote precondition request and data indicating the vehicle is in a ventilated area, and responsive to an estimated precondition time that is derived from the precondition request and data being less than a threshold precondition time that is derived from the precondition request and data, activating a thermal management system to satisfy the precondition request.

According to one or more embodiments, the receiving may include collecting data from external connected devices, GPS, thermal sensors, occupant preferences, or a weather service. The collected data may be indicative of trip data, weather, route data, calendar events, departure data, number of occupants, location of occupants, remote start restrictions, or smart building data. The data indicating the vehicle is in a ventilated area may include a confirmation via a smart building link or connected device. In some embodiments, the data may further indicate calendar entries regarding departure or expected number of occupants from external connected devices. In one or more embodiments, the method may further include, responsive to an occupant preference for comfort over fuel economy, adjusting the precondition request to satisfy an accelerated precondition defined by the occupant preference. In some embodiments, the method may further include, responsive to the estimated precondition time being greater than the threshold precondition time, activating the thermal management system to satisfy a modified precondition request.

According to an embodiment, a climate control system for a vehicle is disclosed. The climate control system includes a thermal management system, and a controller. The controller is configured to, responsive to receiving a remote precondition request, data indicating a preference for fuel economy over comfort, an estimated precondition complete time derived from the request and data being greater than an expected departure time, and user confirmation of delayed departure, activate the thermal management system to satisfy the precondition request.

DETAILED DESCRIPTION

Figure 1:
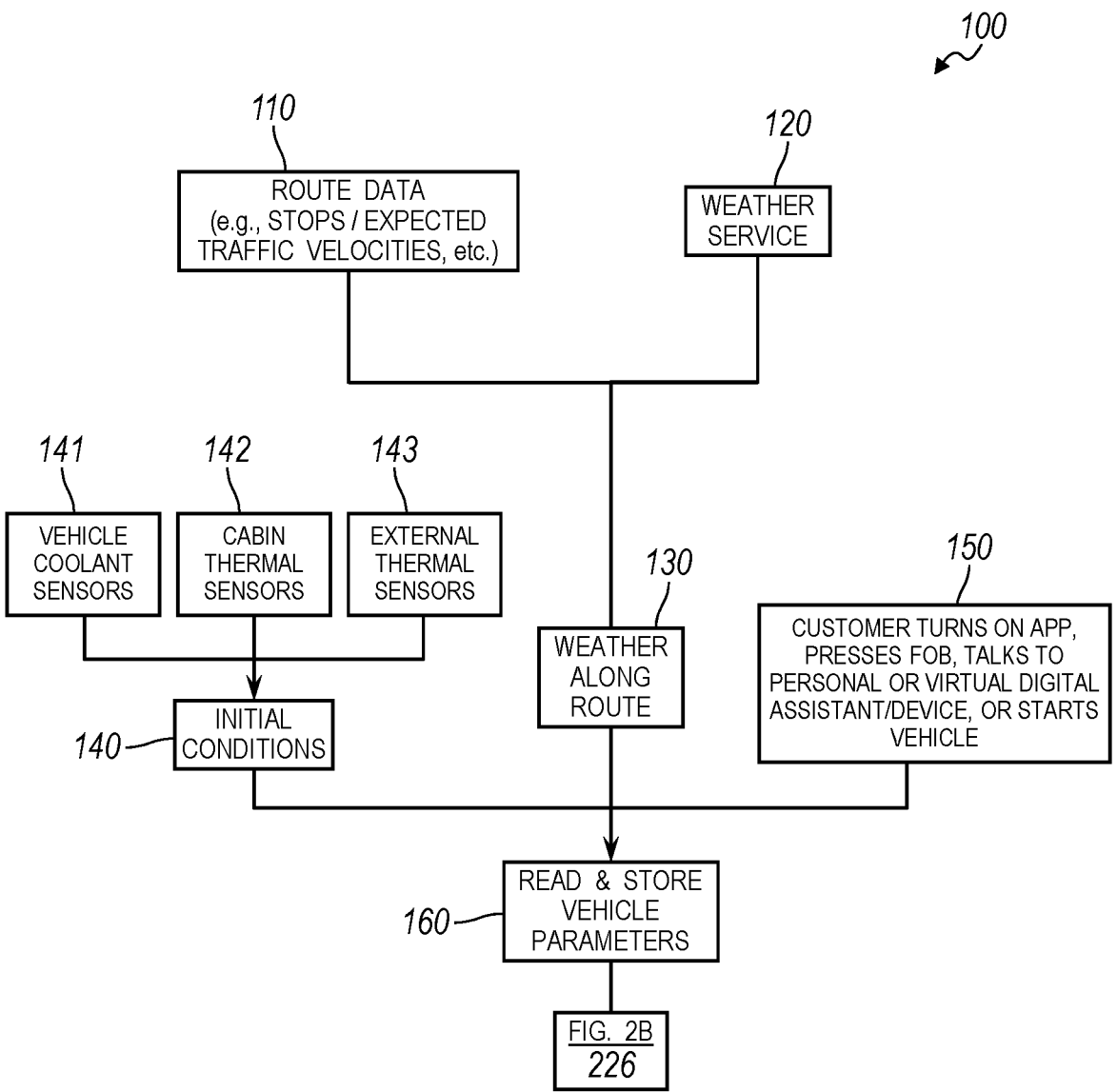
FIG. 1 illustrates a simplified, exemplary flow diagram of a process for collecting external connected data in a trip control scheme, in accordance with one or more embodiments.

As required, detailed embodiments of the present invention are disclosed herein; however, it is to be understood that the disclosed embodiments are merely exemplary of the invention that may be embodied in various and alternative forms. The figures may include features showing examples of details of particular components, and are not meant to be limiting examples. Therefore, specific details disclosed herein and in the figures are not to be interpreted as limiting, but merely as a representative basis for teaching one skilled in the art to variously employ the present invention.

According to one or more embodiments, systems and methods for cost and time efficiently preconditioning a vehicle cabin are disclosed. The optimization of fuel economy and driving range with occupant comfort poses challenges for cost savings. Connected data from external sources can provide an opportunity optimize vehicle cabin comfort and settings, and help control various occupant requests. The optimization of preconditioning the vehicle cabin is useful for electrified vehicles (EV), battery electric vehicles (BEV), hybrid/hybrid electric vehicles (HV/HEV), as well as for conventional internal combustion engine (ICE) vehicles. The optimization is also useful in autonomous vehicle applications. For example, the vehicle receives occupant preferences and precondition requests prior to arrival, and the vehicle can optimize range and fuel economy based on the preferences. On-board computer systems vehicles are typically capable of communicating with external connected devices, via Bluetooth, WiFi, cellular networks, etc. Connected data from external sources includes, but is not limited to, a linked personal digital assistant (e.g. Amazon Alexa, Google Home, Microsoft Cortana, etc.), smart phone, computer, tablet, calendar presets (add current location (GPS, calendar), destination expected travel time), vehicle internet connection (e.g., 4G LTE, Home/Business WiFi), and/or vehicle internal and external sensors (cabin, exterior, engine coolant temperature, humidity, sun load, IR, elevation, etc.) Also, connected data may include weather service and route data. By connecting the vehicle with external connected devices, the data from the devices can provide the vehicle with valuable information to efficiently precondition the vehicle and improve driving range based on the data, occupant comfort, and occupant fuel economy preferences.

Upon receiving and processing the connected data from external sources, the vehicle may receive commands for remote start precondition request, provide feedback to the occupant, and start the vehicle if allowed and timely, thus beginning the precondition of the vehicle cabin. The vehicle may, for example, link with smart building program and activate ventilation, if applicable for combustion engines, to safely provide remote starts. As another example, the vehicle will take advantage of a plug-in vehicle state to thermally precondition vehicle for the trip. In this example, in hot weather, for long trips or fast acceleration, the vehicle may cool and/or possibly overcool the cabin, overcool the battery, evaporator, and storage mechanism (coolant, storage evaporator, evaporator, etc.). In cold weather, the vehicle may, for example, heat the battery for initial performance and overheat the coolant loop, and/or heat and possibly overheat the cabin to provide extra range benefits and luxury benefits, depending on occupant settings. The vehicle may also, for example, calculate fuel used for combustion engines, and calculate range extension and energy consumption for plugged-in vehicles.

After determining the fuel consumption, energy consumption, or range based on the precondition request, the vehicle may notify the occupant if the requested precondition will not complete in time for the expected departure, and may offer a faster precondition option (if possible, for example, for a luxury mode over eco mode selection), or request a flexible departure for maximum range and/or comfort. The vehicle may also notify the driver after calculating the optimal time for precondition and wait to start the vehicle to achieve optimal comfort just in time for occupant entry. The vehicle will then notify the occupant when the precondition has completed via a connected device. The occupant can select preference settings for fuel economy and thermal comfort which can be applied as a default for precondition requests. For example, the occupant can set the default such that cabin heat is requested by the vehicle for a no precondition event, and when the occupant enters, trip data is requested by the system if allowed by preferences or not already supplied. The control system loops based on a time step and/or when there is a new input to the system in order to update the strategy. New inputs and trip information from the external connected devices checked include, but are not limited to, traffic, weather, trip change, occupant change (for example, according to presets), occupant number, occupant type (e.g., additional passengers), occupant conditions and locations, and vehicle location changes.

Referring to FIG. 1, an exemplary control scheme 100 for a climate control system including a controller receiving input from external connected devices is illustrated. A vehicle controller is configured to receive inputs of various types of connected data from external sources via control scheme 100. Connected data from external sources includes, but is not limited to, a linked personal digital assistant (e.g.

Amazon Alexa), smart phone, computer, tablet, calendar presets (add current location (GPS, calendar), destination expected travel time), vehicle internet connection (e.g., 4G LTE, Home/Business WiFi), and/or vehicle internal and external sensors (cabin, exterior, engine coolant temperature, humidity, sun load, IR, elevation, etc.). Route data and weather service is provided to the vehicle at blocks 110 and 120, respectively, in order to determine weather along the route at block 130. Route data includes expected stops (e.g., based on calendar events, user supplied destination and waypoints, and map services (e.g., Google Maps, Apple Maps, Mapquest, etc.)), traffic, expected velocities, total travel time until exiting and turning off the vehicle, speed and time trace via external devices, etc. Other trip data may be acquired from the previously listed source data including, but not limited to, expected trip information, such as previous stops, traffic patterns, expected elevation changes (uphill/downhill driving), expected velocities (including traffic), total travel time until ignition off, speed and time trace, and/or expected number of occupants in the vehicle and their locations, time until departure, and/or occupant drive-mode preference (Eco, Sport, Luxury, Standard, etc.). At block 130, weather along the route is determined using the route data and weather service information to check temperature, precipitation, radiant temperature, mean radiant temperature (MRT), solar flux, wet bulb globe temperature (WBGT), etc. This information is received by the vehicle, read, loaded in and stored as vehicle parameters at block 160. At block 141, initial vehicle coolant conditions are determined. At block 142, initial vehicle cabin conditions are determined. At block 143, initial external vehicle conditions are determined. Initial coolant, cabin, and external data is collected at block 140 and is also loaded into the vehicle and stored at block 160. Upon an occupant (e.g., driver, passenger, device user, or customer) activating the system at block 150, the occupant presets and requests are loaded into the vehicle at block 160. The stored parameters are accessed at block 226 (discussed below), when a customer requests a vehicle precondition, or confirms a precondition based on calendar events in the stored data from the external sources.

Figure 2A:
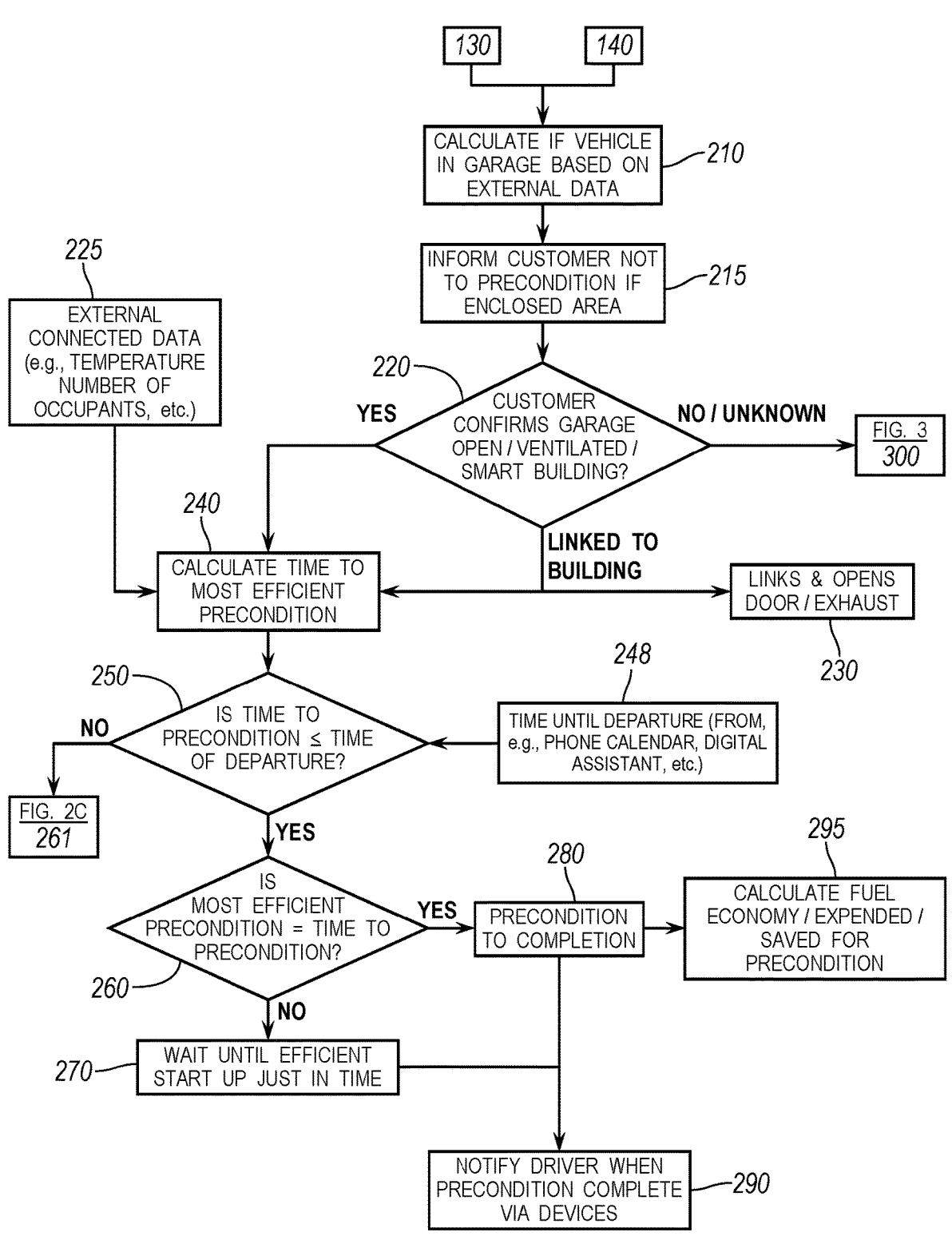
FIG. 2A illustrates a simplified, exemplary flow diagram of a process for controlling vehicle preconditioning based on smart connections and external connected data, in accordance with one or more embodiments.

Referring to FIG. 2A, an exemplary control scheme is shown for determining whether a precondition request is safe based on connected data from external sources. Connected data from external devices from block 130 and initial conditions 140 is input at block 210. At block 210, the system determines whether the vehicle is likely to be in a garage or structure based on the connected data (e.g., GPS, WiFi, cell signal, and/or weather service as compared with initial vehicle conditions). At block 215, the occupant is informed, via the connected devices, not to precondition the vehicle if the vehicle is in an enclosed area (i.e., garage with doors down). At block 220, the customer confirms if the garage door is open, the vehicle is outside or in a ventilated space, or that the vehicle is linked to a smart building (or smart house). If no confirmation is received, or ventilations status is unknown, the strategy continues on to FIG. 3 (discussed below). If the smart building link is confirmed, at block 230, the vehicle links with the smart building app and opens the garage door and/or engages exhaust ventilation systems based on presets. If the customer confirms that a garage door is open, at block 240, the time to efficiently precondition the vehicle is calculated based on external data from block 225. At block 225, the system collects external data such as thermal preconditioning requests for comfort upon entry and expected number of occupants. The program may provide feedback to confirm remote start if a precondition is requested based on location/calendar data (for example, to set a temperature precondition difference (e.g. cooler after working out at the gym)). This precondition request may be selected at the expense of fuel economy or range, unless the vehicle is plugged in (in the case of EVs). The number of vehicle occupants may be determined from external sources such as personal calendars or phone apps.

At block 250, the time to precondition is compared with the time from departure, which is received from external sources as departure information at block 248. If the time to precondition is less than or equal to the time to departure, the system checks whether the precondition time is the most efficient precondition time at block 260. If the time to precondition is greater than the time to departure, the control scheme continues to block 261 (in FIG. 2C, discussed below). If the time to precondition is the most efficient, the vehicle is preconditioned to completion at block 280. If the precondition time is not the most efficient, the system waits until it can achieve the most efficient start up just in time for departure at block 270, and then preconditions the vehicle to completion at block 280. Upon preconditioning the vehicle, at block 290, the occupant is notified via the connected devices that the precondition is complete. Based on the precondition, at block 295, the system calculates fuel burned/energy expended and energy saved for precondition and stores this information in the external devices for future use.

Figure 2B:
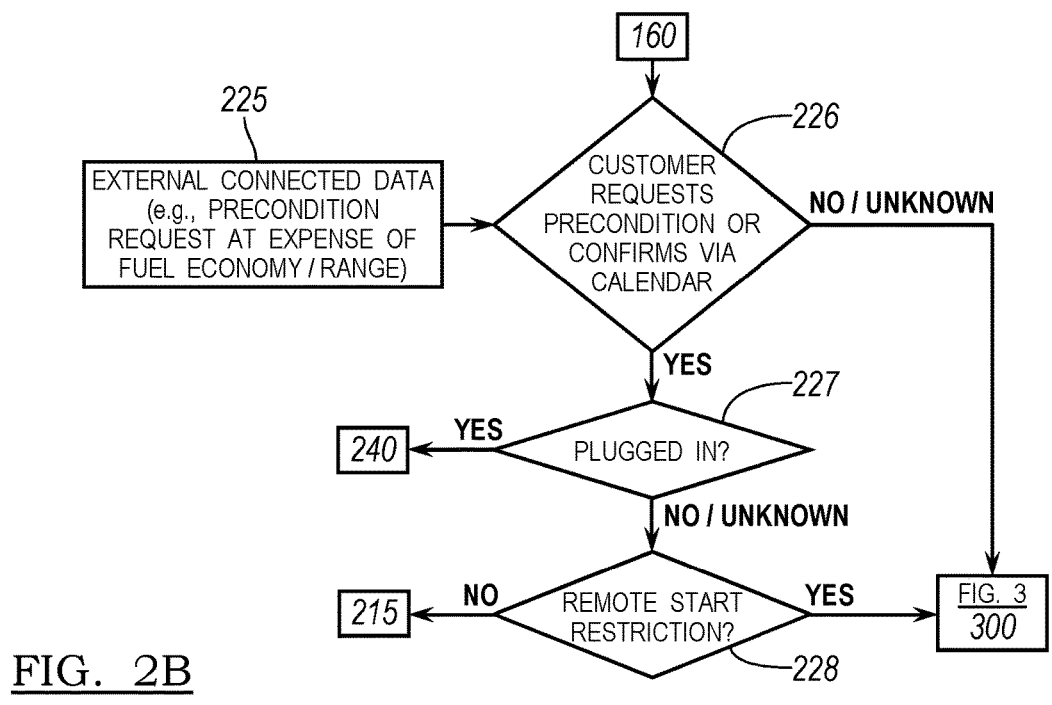
FIG. 2B illustrates a simplified, exemplary flow diagram of a process for controlling vehicle preconditioning based on external connected data, in accordance with one or more embodiments.

Referring to FIG. 2B, at block 226, input is received from the stored vehicle parameters (based on the external connected devices data). At block 226, the customer requests a precondition or confirms the calendar-determined precondition, which is determined from data collected at block 225. If no precondition request is made (or preconditioning requests are unknown), the strategy continues on to block 300 of FIG. 3 (discussed below). At block 227, the system checks whether the vehicle is plugged in (e.g., battery electric, electrified, or hybrid vehicles). If the vehicle is plugged in, the system continues to block 240 to determine the efficient precondition time as previously discussed, and continues on from there. If the vehicle is not plugged in, or the status is unknown, at block 228, the system checks whether any remote start restrictions are in place (i.e., the vehicle is in Europe where EU remote restrictions are in place). If there are remote start restrictions, the strategy continues to block 300 of FIG. 3 (discussed below). If there are no remote start restrictions, the strategy continues to block 215 of FIG. 2A to determine preconditioning features.

Figure 2C:
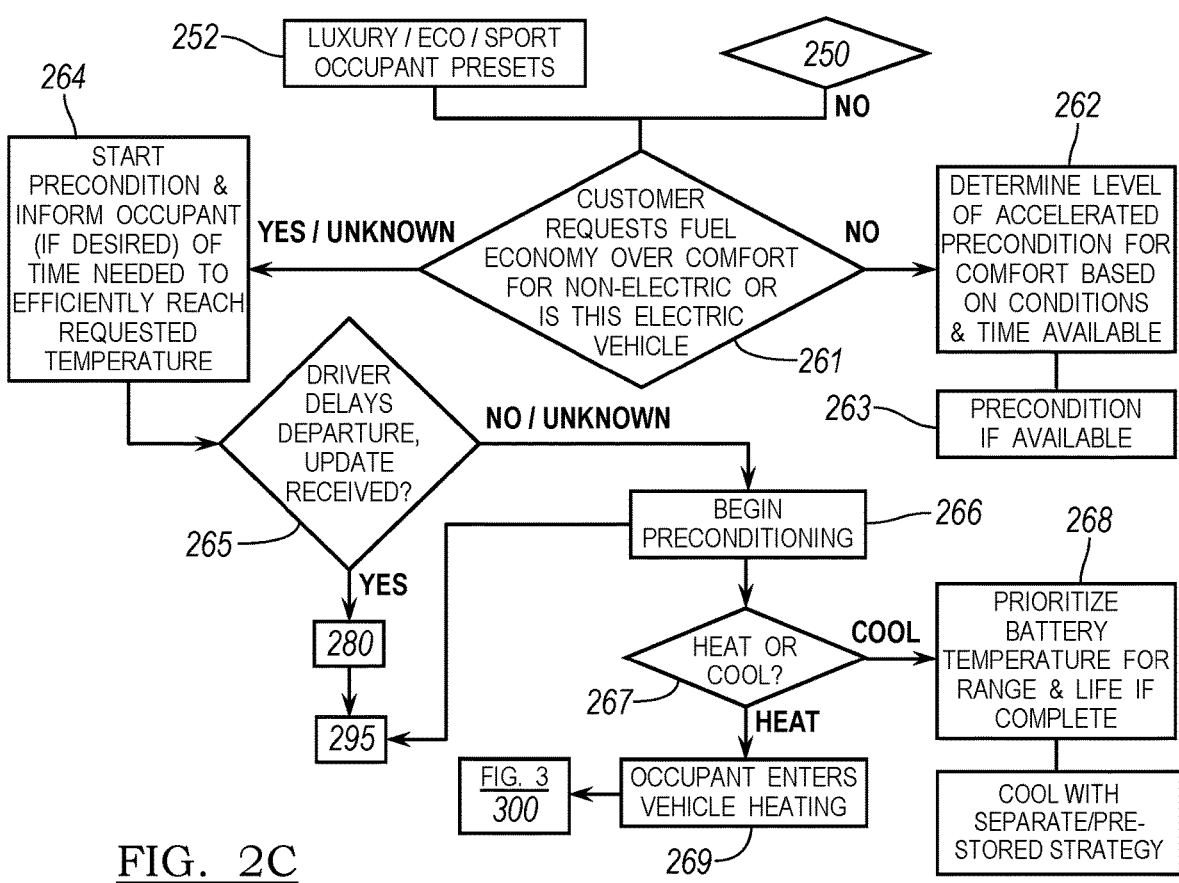
FIG. 2C illustrates a simplified, exemplary flow diagram of a process for controlling vehicle preconditioning based on fuel economy preferences and external connected data, in accordance with one or more embodiments.

Referring to FIG. 2C, following from block 250, where the time to precondition the vehicle is not less than the time until departure, the strategy continues to block 261. Occupant drive-mode preferences (i.e., Eco, Luxury, Sport, etc.) from block 252 are also input to block 261. At block 261, the system checks whether the customer has requested fuel economy over comfort (from external connected devices and sources) for non-electrified vehicles (and subsequently determines whether the vehicle is an electrified vehicle). If the customer has not requested fuel economy over comfort, at block 267, the level of accelerated preconditioning for comfort based on conditions and time available is determined. At block 263, the vehicle is preconditioned if the conditions and time is available. If the customer has requested fuel economy over comfort, at block 264, the system starts preconditioning the vehicle and notifies the driver (if desired as a setting) of the estimated time needed to efficiently reach the precondition. At block 265, the occupant can decide whether to delay the departure based on the efficient precondition time. If the driver delays the departure to efficiently precondition the vehicle, the strategy continues to block 280, where the vehicle is preconditioned to completion. If the driver does not delay the departure (or the response is unknown), the system starts to precondition the vehicle at block 266. Fuel economy/precondition saved energy is determined at block 295. Upon beginning preconditioning of the vehicle, the system, at block 267, checks whether the heating or cooling is needed. If cooling is needed, at block 268, battery temperature is prioritized for the range needed (based on external connected data) and battery life. Upon prioritization, the vehicle is cooled using a separate thermal management strategy, which may be a prestored and/or preexisting programmed strategy. If heating is needed, at block 269, the occupant enters the vehicle as heating is implemented. The strategy then continues to block 300 of FIG. 3, as discussed below.

Figure 3:
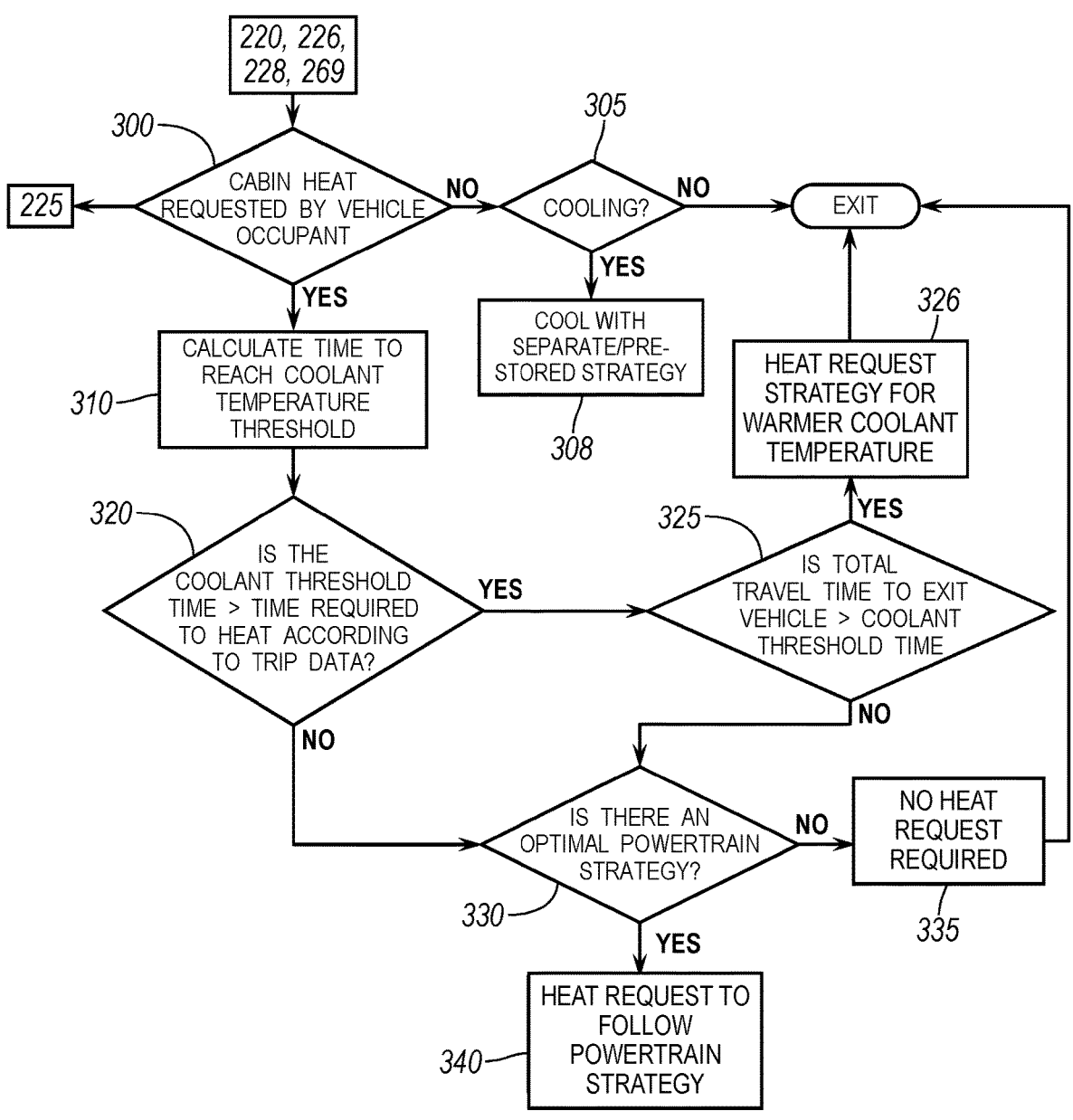
FIG. 3 illustrates a simplified, exemplary flow diagram of a cabin thermal comfort control strategy based on external connected data, in accordance with one or more embodiments.

FIG. 3 shows a climate control strategy for a thermal management system working in conjunction with the precondition strategy, controller, and external connected data. Block 300 receives input from blocks 220, 226, 228, and 229 of the precondition strategy of FIGS. 2A-C and from external connected data collected in block 225. At block 300, the system checks whether cabin heating has been requested by the vehicle occupant. This may be from the vehicle precondition blocks (as previously discussed), or if no precondition request has been made. If no cabin heat is requested, at block 305, the system checks whether a cooling request has been made. If there is no cooling request, the strategy exits. If there is a cooling request, the system cools the vehicle using a separate thermal strategy at block 308, which may be a prestored and/or preexisting programmed thermal management strategy. If cabin heat is requested by the vehicle occupant, at block 310, the time to reach a coolant temperature threshold is calculated using vehicle conditions and external data. At block 320, the time to reach the coolant temperature threshold is compared to the time required to heat the cabin based on trip data. If the time to reach the coolant temperature is less than the time required to heat the cabin, at block 330, the system checks if there is an optimal powertrain strategy. If so, at block 340, the system heat request follows the powertrain strategy. If not, at block 335, heat is not requested and the strategy exits.

If the time to reach the coolant temperature threshold is greater than the time required to heat the cabin, at block 325, the system checks whether the total travel time (i.e., time to exiting the vehicle based on the external connected data) is greater than the time to reach the coolant temperature threshold. If the time to exit the vehicle is not greater than the time to reach the coolant temperature threshold, the system, at block 330, checks if there is an optimal powertrain strategy and proceeds. If the travel time is greater than the time to reach the coolant temperature threshold, at block 326, the system heat strategy is requested for a warmer coolant temperature, and then the strategy exits. As such, the time to reach the coolant threshold is calculated using vehicle cabin and external temperatures and expected speed and time trace to see if heater performance engine curve results in a benefit to occupant. If it does not provide a benefit, it will be ignored, and a powertrain based heat up strategy for performance and/or fuel economy will be used if available and based on preferences. If no extra heat up strategy is available, a base strategy will be used.

Although not depicted, new inputs and trip information may be checked and updated continuously based on the external connected sources and devices. This loop of checking updates various trip information and settings to optimize the thermal comfort and fuel economy based on an occupant's preferences, without actively supplying the information to the vehicle. By coordinating trip information and connected data, the vehicle system may result in significant savings in fuel economy based on remote start preconditioning, short trips, trips with early acceleration, credits for government standard tests (on label and on road), and modifications to standard tests (with and without system to prove usefulness). Electrified vehicles may also see range improvements by calculating expected thermal loads and preconditioning to "charge" the "thermal capacity" of the vehicle battery and/or cabin and by holding off excess battery draw for heating when waste heat will be available from fast acceleration and/or combustion engagement. Thus, occupant experience has potential to be more pleasant, and rewarding by providing, for example, preference settings for comfort and fuel economy, feedback on fuel economy for precondition, ease of use, and a connected vehicle experience, where the vehicle is the smart assistant.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A climate control system for a vehicle comprising:
   a thermal management system; and
   a controller configured to activate the thermal management system to satisfy a remote precondition request for a cabin of the vehicle responsive to receiving the remote precondition request, data indicating the vehicle is in a ventilated area, and an estimated precondition time being less than a threshold precondition time.

2. The climate control system of claim 1, wherein the controller is further configured to receive input indicative of an occupant preference for fuel economy over comfort.

3. The climate control system of claim 2, wherein the controller is further configured to, responsive to the input, activate the thermal management system and inform an occupant of the estimated precondition time.

4. The climate control system of claim 2, wherein the controller is further configured to, responsive to the input and an accelerated precondition time, activate the thermal management system to satisfy the precondition request based on the accelerated precondition time.

5. The climate control system of claim 1, wherein the controller is further configured to, responsive to the estimated precondition time being greater than a departure time, prompting a user to provide confirmation of a delayed departure or an accelerated precondition via a connected device, and activating the thermal management system to satisfy the precondition request based on the confirmation.

6. The climate control system of claim 1, wherein the data is received from external connected devices, GPS, thermal sensors, occupant preferences, or a weather service.

7. The climate control system of claim 1, wherein the data is indicative of trip data, weather, route data, calendar events, departure data, number of occupants, location of occupants, remote start restrictions, or smart building data.

8. The climate control system of claim 1, wherein the controller is further configured to, responsive to data indicating a remote start restriction, send a confirmation request to a connected device or connected smart building.

9. The climate control system of claim 8, wherein the controller is configured to, responsive to receiving confirmation, activate the thermal management system to satisfy the precondition request and communicate with the connected smart building.

10. The climate control system of claim 1, wherein the controller is further configured to, responsive to the estimated precondition time being greater than the threshold precondition time, determine a modified precondition and activate the thermal management system to satisfy the modified precondition.

11. The climate control system of claim 1, wherein the controller is further configured to, responsive to a cabin heat request, a coolant temperature, a time to threshold coolant temperature being greater than a cabin heat time, and a total travel time being greater than the time to threshold coolant temperature, activate the thermal management system to satisfy the cabin heat request.

12. The climate control system of claim 11, wherein the thermal management system is further configured to, responsive to the total travel time being less than the time to threshold coolant temperature, activate a predefined powertrain strategy.

13. A method of preconditioning a vehicle comprising: by a controller, receiving a remote precondition request and data indicating the vehicle is in a ventilated area, and
    responsive to an estimated precondition time that is derived from the precondition request and data being less than a threshold precondition time that is derived from the precondition request and data, activating a thermal management system to satisfy the precondition request.

14. The method of claim 13, wherein the receiving includes collecting data from external connected devices, GPS, thermal sensors, occupant preferences, or a weather service.

15. The method of claim 14, wherein the collected data is indicative of trip data, weather, route data, calendar events, departure data, number of occupants, location of occupants, remote start restrictions, or smart building data.

16. The method of claim 13, wherein the data indicating the vehicle is in a ventilated area includes a confirmation via a smart building link or connected device.

17. The method of claim 13, wherein the data further indicates calendar entries regarding departure or expected number of occupants from external connected devices.

18. The method of claim 13 further comprising, responsive to an occupant preference for comfort over fuel economy, adjusting the precondition request to satisfy an accelerated precondition defined by the occupant preference.

19. The method of claim 13, further comprising, responsive to the estimated precondition time being greater than the threshold precondition time, activating the thermal management system to satisfy a modified precondition request.

20. A climate control system for a vehicle comprising:
    a thermal management system; and
    a controller configured to, responsive to receiving a remote precondition request, data indicating a preference for fuel economy over comfort, an estimated precondition complete time derived from the request and data being greater than an expected departure time, and user confirmation of delayed departure, activate the thermal management system to satisfy the precondition request.

* * * * *